United States Patent [19]

Eberly, Jr.

[11] 4,003,828

[45] Jan. 18, 1977

[54] CATALYST AND PROCESS FOR REMOVING SULFUR AND METAL CONTAMINANTS FROM HYDROCARBON FEEDSTOCKS

[75] Inventor: Paul E. Eberly, Jr., Baton Rouge, La.

[73] Assignee: Exxon Research and Engineering Company, Linden, N.J.

[22] Filed: July 23, 1975

[21] Appl. No.: 598,285

[52] U.S. Cl. .......................... 208/251 H; 208/213; 208/216; 208/217

[51] Int. Cl.$^2$ ................ C10G 29/04; C10G 23/02

[58] Field of Search ............. 208/251 H, 216, 213, 208/217; 252/437

[56] References Cited

UNITED STATES PATENTS

| | | | |
|---|---|---|---|
| 3,271,299 | 9/1966 | Kearby | 208/216 |
| 3,287,280 | 11/1966 | Colgan et al. | 252/437 |
| 3,493,517 | 2/1970 | Jaffe | 252/437 |
| 3,544,452 | 12/1970 | Jaffe | 208/216 |
| 3,897,365 | 7/1975 | Feins et al. | 252/437 |
| 3,904,550 | 9/1975 | Pine | 208/216 |
| 3,928,179 | 12/1975 | Gatsis | 208/213 |

*Primary Examiner*—Herbert Levine
*Assistant Examiner*—James W. Hellwege
*Attorney, Agent, or Firm*—Roy J. Ott

[57] ABSTRACT

Sulfur and metal contaminants, such as nickel, vanadium and iron, are removed from hydrocarbon feedstocks, by contacting the feedstocks at an elevated temperature and pressure in the presence of hydrogen and a catalyst comprising a hydrogenation component and a support material comprised of phosphorus oxide and alumina. The hydrogenation component includes a Group VIB and/or Group VIII metal of the Periodic Table, particularly molybdenum or tungsten and cobalt or nickel. The presence of phosphorus oxide in the catalyst composition has been found to impart increased catalytic activity for demetallization of metal-contaminated hydrocarbon feedstocks such as heavy petroleum crudes and residua.

10 Claims, No Drawings

CATALYST AND PROCESS FOR REMOVING SULFUR AND METAL CONTAMINANTS FROM HYDROCARBON FEEDSTOCKS

BACKGROUND OF THE INVENTION

1. Field of the Invention

This invention relates to a catalyst and a process for removing sulfur and metal contaminants from hydrocarbon feedstocks. More particularly, the invention is concerned with a hydrotreating process for removing metal contaminants, such as nickel and vanadium, from petroleum pertroleum crudes and residua.

2. DESCRIPTION OF THE PRIOR ART

Various processes, such as cracking and hydrocracking, are known for the conversion of hydrocarbons to low molecular weight products. The catalytic cracking of petroleum feedstocks is one of the major refining operations employed in the conversion of crude petroleum oils to more desirable fuel products, such as heating oils and high-octane gasoline. In general, crude petroleum oils are separated by distillation into a gas oil portion and a heavy end portion or residuum. The gas oil portion of the crude petroleum oil is then catalytically converted and upgraded to high value fuels, while the heavy ends, such as the 1050° F+ materials, are used as low grade fuel or as asphaltic materials.

Supply and demand considerations have recently provided new incentives for catalytically converting the heavy ends of petroleum crude oils. Unfortunately, the catalytic conversion of crudes or residua which contain relatively large amounts of heavy ends and/or 1050° F+ materials to lower boiling and more useful hydrocarbons presents a particularly difficult problem. This is the case because the so-called residua or heavy ends contain relatively high concentrations of metals, such as nickel and vanadium, which are poisons for many catalyst systems which may be used for the catalytic conversion of these heavy crudes or residua. The present invention relates to an improved catalyst system for removing the metal contaminants from heavy crude oils or residua.

SUMMARY OF THE INVENTION

In accordance with the invention, it has now been found that the demetallization and desulfurization activities of catalysts comprising a hydrogenation component and an alumina-containing support can be improved by incorporating phosphorus oxide into the alumina present in the support material. It has, therefore, been unexpectedly found that the presence of certain amounts of phosphorus oxide in the alumina structure unexpectedly improves the demetallization activity as compared to catalyst compositions not having specific amounts of phosphorus oxide incorporated therein.

The catalysts of the invention comprise catalytically active amounts, e.g. 0.1 to 50 percent by weight based on total catalysts, of a hydrogenation component which includes a Group VIB and/or a Group VIII metal as set forth in the Periodic Table of the Elements (E.H. Sargent and Company, Copyright 1962, Dyna-Slide Company.) Suitable examples of such metals include, among others, chromium, molybdenum, tungsten, cobalt, nickel, platinum, palladium, and rare earth metals of the lanthanum series such as La, Ce, Pr, etc. Metals may be present on the catalyst as oxides, sulfides, reduced forms of the metal or as mixtures of these and other forms. A preferred hydrogenation metallic component, and forms thereof, comprises an oxide or sulfide of molybdenum and tungsten of Group VIB, and an oxide or sulfide of nickel and cobalt of Group VIII, preferably a mixture of one of said Group VIB and one of said Group VIII metals. The catalysts will typically comprise from about 5 to about 50%, preferably from about 10 to about 25% (as the oxide) of a Group VIB metal, and from about 1 to about 12%, preferably from about 3 to about 8% (of the oxide) of a Group VIII metal, based on the total weight (dry basis) of the composition. Particularly preferred catalysts are composites of nickel or cobalt oxide with molybdenum, used in the following approximate proportions: from about 1 to about 12%, but preferably from about 3 to about 8 wt. % of nickel or cobalt oxides; and from about 5 to about 50 wt. %, preferably from about 10 to about 25 wt. % of molybdenum oxide based on the total weight (dry base) of the catalyst composition.

The alumina support material employed in the catalyst of the invention may be combined with various amounts of silica, zirconia, magnesia, boria, titania, ceria, and the like. When the alumina is in combination with another support material, the amount of alumina in the support will vary from about 50 to 100% by weight, based on the dry weight of the catalyst support. Supports consisting of alumina, phosphorus oxide and the aforementioned oxide support materials are generally prepared by cogellation; coprecipitation or cohydrolysis techniques such as, for example, the hydrolysis of alkoxides.

Phosphorus oxide, which is incorporated into the catalyst in accordance with the invention, is present in an amount within the range of 1.0 to 6 wt. %, preferably 1.1 to 5.5 wt. % expressed as $P_2O_5$ and based on the weight (dry basis) of the alumina and incorporated phosphorus oxide. Since the exact nature of the phosphorus oxide in the support is not known, it is to be understood that the amount of phosphorus oxide could equally be expressed as wt. % $PO_4$.

The feedstocks which are demetallized in accordance wtih the invention include those hydrocarbons containing metal contaminants such as nickel, vanadium, iron, and the like. In general, these feedstocks will contain more than 5 ppm (parts per million), particularly more than 50 ppm of one or more of the aforementioned metal contaminants such as nickel and vanadium. These feedstocks will typically include heavy petroleum crudes and residua, such as vacuum gas oil, atmospheric residua, vacuum residua, etc. The feedstocks may also comprise liquids derived from coal, shale and tar sands containing one or more of the aforementioned metal contaminants.

The phosphorus oxide may be incorporated into the alumina support by well-known techniques such as cogellation. For example, a phosphorus-containing acid, such as phosphoric acid, and another acid such as sulfuric acid, and/or a salt thereof, such as aluminum sulfate or aluminum phosphate is added to an aqueous basic solution of an alkali metal aluminate, such as sodium aluminate, to produce a cogel precipitate of alumina and phosphorus oxide. Alternatively, a phosphorus containing salt such as sodium phosphate or ammonium phosphate is dissolved in the sodium aluminate solution. The cogellation or coprecipitation is then accomplished by adding sulfuric acid and/or aluminum sulfate solutions. The cogel is then filtered, washed, and dried to produce the support material comprising alumina having the phosphorus oxide incorporated in the alumina structure.

In a preferred embodiment, the support component comprising alumina having phosphorus oxide incorporated therein is prepared as follows. A solution of sulfuric and phosphoric acids is gradually added with stirring to an aqueous solution of sodium aluminate at a temperature ranging from ambient, or below, to the boiling point of the reaction mixture, usually in the range of 20 to 100° C. The resulting mixture is then contacted with an aqueous solution of aluminum sulfate to further reduce the pH of the solution and to complete the formation of a cogel of alumina and phosphorus oxide. The cogel is subsequently filtered, washed, spray-dried, extruded and impregnated with the hydrogenating metal components in a conventional manner. The addition of the acid to the aqueous alkali metal aluminate solution is usually conducted over a period of 20 to 180 minutes, more usually 20 to 60 minutes, followed by an additional reaction time of 1 to 16 hours after the addition has been completed. Although the concentration of the aqueous alkali metal (e.g., Na, K, Li etc.) aluminate solution may vary widely, the solution will conveniently contain from about 1 to 20 grams, preferably 2 to 10 grams, of alkali metal aluminate per 100 milliliters of solution. The phosphorus-containing acid is preferably added in mixture with sulfuric acid (mole ratio of phosphorus-containing acid-sulfuric acid may typically range from about 0.005 to 0.3, more usually 0.015 to 0.25) to partially neutralize the sodium aluminate to a pH of 10 to 12. The resultant mixture is then further neutralized with an aqueous solution of aluminum sulfate to a pH usually in the range of 8 to about 9.

The aforedescribed reaction conditions are not particularly critical, except that a sufficient amount of the phosphorus-containing acid should be employed to give a gel product containing from about 1 to 6, preferably 1.1 to 5.5, wt. % phosphorus expressed as $P_2O_5$ and based on the dry weight of the alumina and incorporated phosphorus oxide. The phosphorus-containing acid will include the phosphoric and/or phosphorus acids such as orthophosphoric acid, pyrophosphoric acid, metaphosphoric acid, hypophosphoric acid, orthophosphorus acid, pyrophosphorus acid, metaphosphorus, hypophosphorus acid, etc.

While not known with certainty, it is believed that the phosphorus in some manner affects the gellation so as to produce an alumina-containing support of increased pore size resultng in improved capacity to remove metal contaminants such as nickel and vanadium from a hydrocarbon feedstock. Phosphorus addition alters the chemistry of the surface producing sites which are more active for the demetallization process.

After formation of the phosphorus-containing gel precipitate, the product is filtered, washed, spray dried, and combined with one or more of the aforedescribed hydrogenation components in accordance wih well-known techniques, such as impregnation or vapor deposition. The hydrogenation component may also be added by co-precipitation of an appropriate metal during formation of the oxide sulfur material. In a preferred embodiment, the catalyst containing the metal hydrogenation component, can be contacted with hydrogen and hydrogen sulfide, or hydrogen sulfide precursor in a subsequent step, or steps, to reduce and sulfide all or part of the metal salts and activate the catalyst. Sulfiding is generally carried out by passing hydrogen sulfide in admixture with hydrogen to a zone of contact with the catalyst. The temperature of sulfiding is not particularly critical, but is generally carried out in the range of about 500° to about 900° F, preferably from about 600° to about 800° F. The time required for the sulfiding of the metals is generally from 1 to 24 hours. Typically, in sulfiding the catalyst, the catalyst is contacted with a dilute gaseous solution, e.g., about 5 to about 15%, preferably from about 8 to about 12%, of hydrogen sulfide in hydrogen, or hydrogen plus other non-reactive gases, and the contacting is continued typically for a 16 hour period. Such treatment converts metals or metal oxides on the catalyst to the sulfide form.

In accordance with the invention, the aforedescribed catalyst is employed to demetallize and desulfurize a feedstock by contacting the feedstock at a temperature in the range of 500° to 900° F, preferably 600° to 800° F, in the presence of hydrogen at a pressure of 200 to 4000, preferably 600 to 3000 psig, a feed to catalyst rate of 0.1 to 10, preferably 0.3 to 3 V/V/Hr. and a hydrogen treat rate of 500 to 10,000, preferably 2000 to 6000 standard cubic feet per barrel of feed (SCF/B).

DESCRIPTION OF THE PREFERRED EMBODIMENTS

The following examples further illustrate the present invention. Unless otherwise specified, all percentages and parts are by weight.

EXAMPLE 1

This example describes the preparation of several catalysts of the invention by cogellation of phosphorus oxide and alumina by the reaction of sodium aluminate, phosphoric acid, sufuric acid and aluminum sulfate.

The catalysts containing phosphorus oxide were prepared by the general scheme wherein a basic aqueous solution of sodium aluminate was partially neutralized at about 47° C by adding dropwise over a period of about 20–30 minutes a solution containing sulfuric acid and phosphoric acid to neutralize the aqueous sodium aluminate solution to a pH of about 10 to 12. This was followed by the dropwise addition over about 20–30 minutes of an aqueous aluminum sulfate solution to a final pH of 8.8 to 9.0. A precipitate was formed which was then filtered, washed, spray-dried at 115° to 150° C, extruded to 1/16 size extrudates. The extruded catalysts were then impregnated sequentially with molybdenum oxide and cobalt oxide by using aqueous solutions of ammonium heptamolybdate and cobalt nitrate hexahydrate, respectively. The catalysts were then calcined in air for 3 hours at 1000° F. The reactant ratios and the properties of these catalysts are shown below in Table I wherein catalysts A-D of the invention were prepared in accordance with the procedure of this example. No phosphoric acid was used in the preparation of Catalyst E. The amount of phosphorus in the catalyst support material is expressed as $P_2O_5$. These catalysts were sulfided for 16 hours at 750° F using a 10% $H_2S$ in $H_2$ stream prior to testing with the Safaniya atmospheric residuum.

TABLE I

| Catalyst Designation | A | B | C | D | E |
|---|---|---|---|---|---|
| Reactant Mole Ratio | | | | | |
| $H_2SO_4$/Na $AlO_2$ | 1.95 | 1.95 | 1.95 | 1.95 | 1.95 |
| $H_3PO_4$/Na $AlO_2$ | 0.032 | 0.064 | 0.128 | 0.252 | 0 |
| $Al_2(SO_4)_3$/Na $AlO_2$ | 0.197 | 0.197 | 0.197 | 0.197 | 0.197 |
| Composition, Wt. % | | | | | |
| $P_2O_5$ [1] | 1.12 | 2.61 | 5.46 | 10.33 | 0.0 |
| CoO [2] | 3.2 | 3.2 | 3.2 | 3.2 | 3.2 |
| $MoO_3$ [2] | 12.6 | 12.6 | 12.6 | 12.6 | 12.6 |
| Surface Area, $M.^2$/g. | 286 | 292 | 246 | 172 | 284 |
| Pore Volume, $cm.^3$/g. | 0.46 | 0.56 | 0.41 | 0.54 | 0.48 |

[1] Based on weight of alumina and incorporated phosphorus oxide
[2] Based on total weight of catalyst composition

EXAMPLE 2

The catalysts prepared in Example 1 were tested in accordance with the invention to demetallize and desulfurize a Safaniya residuum having the analysis shown below in Table II.

TABLE II

| Analysis For Safaniya Atmospheric Residuum | |
|---|---|
| Gravity, °API | 14.9 |
| Sulfur, wt. % | 3.61 |
| Nickel Content, ppm | 24.0 |
| Vanadium Content, ppm | 87.2 |
| Distillation, Vol. % | |
| IBP | 411 |
| 5 | 534 |
| 10 | 642 |
| 20 | 743 |
| 30 | 829 |
| 40 | 901 |
| 50 | 995 |
| 60 | — |
| 70 | — |
| 80 | — |
| 90 | — |
| 95 | — |
| FBP | 1050 |
| Volume % Recovery | 58 |
| Volume % Residue | 42 |

The Safaniya residum was contacted with Catalysts A-E of Example 1 at 750° F, 1500 psig, a catalyst/feed rate of 1 V/V/Hr. in the presence of hydrogen at an addition rate of 4,000 SCF/B. The results given below in Table III show a substantial increase in demetallization with the catalyst of the invention.

TABLE III

| | DEMETALLIZATION AND DESULFURIZATION OF SAFANIYA ATM. RESIDUUM | | | | |
|---|---|---|---|---|---|
| Catalyst Designation | A | B | C | D | E |
| Wt. % $P_2O_5$ in catalyst support* | 1.12 | 2.61 | 5.46 | 10.33 | 0 |
| Sulfur, 1.5 order, K, hr. $^{-1}$ | 1.03 | 0.713 | 0.548 | 0.454 | 0.981 |
| % Vanadium Removal | 49.4 | 75.9 | 70.1 | 61.4 | 48.7 |
| % Nickel Removal | 37.3 | 59.7 | 54.1 | 48.7 | 34.2 |

*Based on weight of alumina and incorporated phosphorus oxide.

What is claimed is:

1. A process for removing metal and sulfur contaminants from a feed stock which comprises (a) contacting a metal and sulfur contaminated feedstock in a conversion zone at 500–900° F in the presence of hydrogen with a catalyst comprising a hydrogenating component and a support component comprised of alumina having 1 to 6 wt.% phosphorus oxide expressed as $P_2O_5$ incorporated therein based on the weight of the alumina and incorporated phosphorus oxide and (b) recovering from said conversion zone a feedstock having a reduced metal and sulfur content.

2. The process of claim 1 wherein said feedstock contains more than 5 pm of vanadium and nickel and a hydrocarbon portion boiling above 1050° F at atmospheric pressure.

3. The process of claim 1 wherein said support contains 1.1 to 5.5 wt.% phosphorus oxide expressed as $P_2O_5$ and is prepared by the formation of a cogel thereof.

4. The process of claim 3 wherein said hydrogenating component comprises a Group VIB metal or compound thereof and/or a Group VIII metal or compound thereof.

5. The process of claim 4 wherein said group VIB metal is molybdenum and/or tungsten and said Group VIII metal is nickel and/or cobalt.

6. A process for removing metal and sulfur contaminants from a feedstock which comprises contacting a feedstock containing more than 50 ppm of a metal selected from the group consisting of nickel, vanadium and mixtures thereof in a conversion zone at 500°–900° F in the presence of hydrogen with a catalyst comprising a hydrogenating component and a support comprised of alumina having 1 to 6 wt.% phosphorus oxide expressed at $P_2O_5$ incorporated therein based on the weight of the alumia and incorporated phosphorus oxide said support prepared by the cogellation of alumina and phosphorus oxide.

7. The process of claim 6 wherein said support is prepared from a cogel produced by the reaction of an alkali metal aluminate with a phosphorus-containing acid and sulfuric acid and/or a salt of sulfuric acid.

8. The process of claim 7 wherein said phosphorus containing acid is phosphoric acid and said salt is aluminum sulfate.

9. The process of claim 8 wherein said hydrogenating component comprises a Group VIB metal or compound thereof and/or a Group VIII metal or compound thereof.

10. The process of claim 9 including the step of recovering from said conversion zone a feedstock having a reduced metal and sulfur content.

* * * * *